(12) United States Patent
Kaminaka et al.

(10) Patent No.: US 11,764,368 B2
(45) Date of Patent: Sep. 19, 2023

(54) TITANIUM MATERIAL, SEPARATOR, CELL, AND POLYMER ELECTROLYTE FUEL CELL STACK

(71) Applicant: Nippon Steel Corporation, Tokyo (JP)

(72) Inventors: Hideya Kaminaka, Tokyo (JP); Yoshitaka Nishiyama, Tokyo (JP); Koichi Nose, Tokyo (JP); Junko Imamura, Tokyo (JP); Haruka Sato, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 48 days.

(21) Appl. No.: 16/470,683

(22) PCT Filed: Dec. 18, 2017

(86) PCT No.: PCT/JP2017/045328
§ 371 (c)(1),
(2) Date: Jun. 18, 2019

(87) PCT Pub. No.: WO2018/123690
PCT Pub. Date: Jul. 5, 2018

(65) Prior Publication Data
US 2020/0091523 A1    Mar. 19, 2020

(30) Foreign Application Priority Data

Dec. 28, 2016 (JP) .................... 2016-256044

(51) Int. Cl.
*H01M 8/10* (2016.01)
*H01M 8/0228* (2016.01)
(Continued)

(52) U.S. Cl.
CPC ....... *H01M 8/0228* (2013.01); *H01M 8/0206* (2013.01); *H01M 8/0215* (2013.01);
(Continued)

(58) Field of Classification Search
CPC ............. H01M 8/0228; H01M 8/0206; H01M 8/0215; H01M 8/1018; H01M 2008/1095;
(Continued)

(56) References Cited

U.S. PATENT DOCUMENTS

2010/0239949 A1* 9/2010 Maeda ................ H01M 8/0247
429/483
2010/0260928 A1* 10/2010 Hasegawa ........... H01M 8/0228
427/115
(Continued)

FOREIGN PATENT DOCUMENTS

CN      104310377 B    12/2015
JP      H02-93097 A    4/1990
(Continued)

OTHER PUBLICATIONS

Afifi et al., Transport properties of polycrystalline TiO2 and Ti2O3 as semiconducting oxides, Elsevier, Journal of Alloys and Compounds, 455 (2008), pp. 92-97 (Year: 2008).*
(Continued)

*Primary Examiner* — Christian Roldan
(74) *Attorney, Agent, or Firm* — Banner & Witcoff, Ltd.

(57) ABSTRACT

A titanium material including a base metal made of pure titanium or a titanium alloy and a titanium oxide film formed on the base metal. Peak intensities obtained by thin-film X-ray diffraction analysis performed on an outer layer of the titanium material using an incident angle of 0.3° satisfy $(I(104)+I(200))/I(101) \geq 0.08 - 0.004 \times I(200)$, where $I(104)$ is the peak intensity resulting from a plane (104) of a $Ti_2O_3$ phase, $I(200)$ is the peak intensity resulting from a plane (200) of a TiO phase, $I(101)$ is the peak intensity resulting from a plane (101) of an α-Ti phase, and $0 < I(104)$, $0 \leq I(200)$, and $0 < I(101)$. The titanium material is inexpensive and has both the electrical conductivity and corrosion resistance.

6 Claims, 2 Drawing Sheets

(51) Int. Cl.
  *H01M 8/0206* (2016.01)
  *H01M 8/0215* (2016.01)
  *H01M 8/1018* (2016.01)

(52) U.S. Cl.
  CPC .. *H01M 8/1018* (2013.01); *H01M 2008/1095* (2013.01); *H01M 2300/0082* (2013.01)

(58) Field of Classification Search
  CPC . H01M 2300/0082; H01M 8/10; Y02E 60/50; C25D 11/26; C23C 8/12
  USPC .......................................................... 429/492
  See application file for complete search history.

(56) References Cited

U.S. PATENT DOCUMENTS

| | | | | |
|---|---|---|---|---|
| 2010/0310969 | A1* | 12/2010 | Maeda ................ | H01M 8/0228 429/514 |
| 2011/0165501 | A1* | 7/2011 | Maeda ................ | H01M 8/0228 429/518 |
| 2011/0177430 | A1* | 7/2011 | Takahashi .......... | H01M 8/0206 72/236 |
| 2012/0171468 | A1* | 7/2012 | Tanaka ................ | H01M 8/0206 148/284 |
| 2016/0141635 | A1* | 5/2016 | Kanno .................... | C22C 14/00 83/13 |
| 2018/0047997 | A1* | 2/2018 | Imamura .................. | C23C 8/12 |
| 2018/0191000 | A1* | 7/2018 | Imamura ............. | H01M 8/0228 |

FOREIGN PATENT DOCUMENTS

| | | |
|---|---|---|
| JP | H03-294471 A | 12/1991 |
| JP | 2009-295346 A | 12/2009 |
| JP | 2010-045052 A | 2/2010 |
| JP | 2014-062306 A | 4/2014 |
| WO | 2016-140306 A1 | 9/2016 |

OTHER PUBLICATIONS

Kostenko et al., Superposition of M5X5 Superstructures and X-ray diffraction in TiO Titanium Monoxide, Journal of Experimental and Theoretical Physics, 2017, vol. 125, pp. 235-245. (Year: 2017).*
Elmer et al., Spatially Resolved X-Ray Diffraction Phase Mapping and $\alpha$-$\beta$-$\alpha$ Transformation Kinetics in the Heat-Affected Zone of Commercially Pure Titanium Arc Welds, Metallurgical and Material Transactions, vol. 29A 1998, pp. 2761-2773. (Year: 1998).*
Mergenbayeva et al., Ti2O3/TiO2-Assisted Solar Photocatalytic Degradation of 4-tert-Butylphenol in Water, Catalyst, MDPI, 2021, 11, 1379, 1-20. (Year: 2021).*
English Abstract of JP2009-295346.
English Abstract of JP2010-045052.
English Abstract of JPH03-294471.
National Institute for Materials Science, "Novel Approach to Designing Nanostructured Reduced Titanium Oxides for a Wide Range of Applications," Jul. 6, 2011.
"New electrically conductive ceramic—A fundamental advance in electrode technology" Am Lab, vol. 20, No. 6-A, pp. 8, 10.
Sato et al. "Characteristics of Titanium Separator with Graphite Coating for Polymer Electrolyte Fuel Cell," Kobe Steel Engineering Reports, vol. 65, No. 2, (Sep. 2015).
Kubo et al. "The Reaction Mechanism of Formation of Titanium Carbide under Vacuum," The Journal of the Society of Chemical Industry, vol. 63, No. 1 (1960), pp. 64-70.

\* cited by examiner

TITANIUM MATERIAL, SEPARATOR, CELL, AND POLYMER ELECTROLYTE FUEL CELL STACK

TECHNICAL FIELD

The present invention relates to a titanium material, a separator for a polymer electrolyte fuel cell using the titanium material, a cell using the separator, and a polymer electrolyte fuel cell stack using the cell.

BACKGROUND ART

Examples of the application of metal materials that excel in electrical conductivity include a collector of a battery and a battery enclosure. In a fuel cell application, such metal materials are used as metal collector separator materials. In an environment in which corrosion can occur, stainless steel or titanium is used as a metal material that excels in corrosion resistance. The reason why stainless steel has corrosion resistance is that an oxide film primarily made of $Cr_2O_3$ is produced on the outer layer of the stainless steel and protects the base metal thereof. Similarly, the reason why a titanium material has corrosion resistance is that an oxide film primarily made of $TiO_2$ is produced on the outer layer of the titanium material and protects the base metal thereof.

The oxide films are useful for improvement in the corrosion resistance but are poor in electrical conductivity and therefore hinder use of the intrinsic electrical conductivity of the metal that forms the base metal. To satisfy both the corrosion resistance and the electrical conductivity, for example, stainless steel or a titanium material on which a precious metal is plated has been used. Precious metals have high corrosion resistance and excel in electrical conductivity.

Patent Literature 1 discloses a metal material including a metal base, an adhesive layer formed on the surface of the metal base and containing Pd, and an electric contact layer formed on the surface of the adhesive layer and primarily containing Au, Pt, Rh, Ir, or Ag. Patent Literature 1 describes that the metal material can maintain high electrical conductivity even in a corrosive environment.

Patent Literature 2 discloses an electrically conductive member including a metal base, a corrosion resistant layer provided on the surface of the metal base, and an electrically conductive alloy film layer provided on the corrosion resistant layer. The electrically conductive alloy film layer contains one or more precious metals selected from Au and Pt and one or more nonprecious metals selected from Zr, Nb, and Ta and has a thickness of 2 nm or more. Patent Literature 2 describes that a separator using the electrically conductive member described above excels in acid resistance and can lower contact resistance.

Non Patent Literature 1 proposes that a titanium oxide having corrosion resistance and electrical conductivity is synthesized to form an electrode that replaces electrodes using precious metals.

CITATION LIST

Patent Literature

Patent Literature 1: JP2009-295346A
Patent Literature 2: JP2010-045052A
Patent Literature 3: JP03-294471A

Non Patent Literature

Non Patent Literature 1: National Institute for Materials Science, "Novel Approach to Designing Nanostructured Reduced Titanium Oxides for A Wide Range of Applications," Jul. 6, 2011
Non Patent Literature 2: "New electrically conductive ceramic—A fundamental advance in electrode technology" Am Lab, Vol. 20, No. 6-A, pp. 8, 10
Non Patent Literature 3: Toshiki Sato and one other, "Characteristics of Titanium Separator with Graphite Coating for Polymer Electrolyte Fuel Cell," Kobe Steel Engineering Reports, Vol. 65, No. 2, (September 2015)
Non Patent Literature 4: Teruichiro Kubo and one other, "The Reaction Mechanism of Formation of Titanium Carbide under Vacuum," The Journal of the Society of Chemical Industry, Vol. 63, No. 1 (1960), pp. 64-70

SUMMARY OF INVENTION

Technical Problem

However, the techniques disclosed in Patent Literatures 1 and 2, in which Au and other precious metals (including Pt and other platinum-group elements) are used, result in high cost and have a problem from the viewpoint of resource quantity restriction. It has therefore been required to improve the electrical conductivity of metal materials by using a material that is economical and abundant in the amount of resource.

The techniques described in Non Patent Literature 1 can achieve an electrically conductive material having corrosion resistance and electrical conductivity with no precious metal. The technique described in Non Patent Literature 1, however, results in poor mass productivity at present and does not after all provide a titanium oxide that allows sufficient reduction in cost. Further, in an electrode application, for example, metal materials are more advantageous than titanium oxides in terms of strength and electrical conductivity. Therefore, to use the technique described in Non Patent Literature 1 to form, for example, electrodes, a titanium oxide needs to be formed on the surface of the metal base. Non Patent Literature 1, however, discloses no method for forming a titanium oxide on the outer layer of the metal base.

In view of the situations described above, an objective of the present invention is to provide a titanium material and a separator for a polymer electrolyte fuel cell that are inexpensive and have both the electrical conductivity and corrosion resistance. Another objective of the present invention is to provide a polymer electrolyte fuel cell and a polymer electrolyte fuel cell stack that are inexpensive and can maintain high power generation efficiency.

Solution to Problem

A titanium material according to an embodiment of the present invention includes a base metal made of pure titanium or a titanium alloy and a titanium oxide film formed on the base metal. Peak intensities obtained by thin-film X-ray diffraction analysis performed on an outer layer of the titanium material using an incident angle of 0.3° satisfy a following Formula (1):

$$I(104)+I(200))/I(101) \geq 0.08 - 0.004 \times I(200) \quad (1)$$

where

I(104): Peak intensity resulting from a plane (104) of a $Ti_2O_3$ phase,

I(200): Peak intensity resulting from a plane (200) of a TiO phase,

I(101): Peak intensity resulting from a plane (101) of an α-Ti phase, and 0<I(104), 0≤I(200), and 0<I(101).

A separator for a polymer electrolyte fuel cell according to an embodiment of the present invention includes the titanium material described above.

A polymer electrolyte fuel cell according to an embodiment of the present invention includes the separator described above.

A polymer electrolyte fuel cell stack according to an embodiment of the present invention includes the cell described above.

Advantageous Effects of Invention

The titanium material and the separator for the polymer electrolyte fuel cell are inexpensive and have both the electrical conductivity and corrosion resistance. The polymer electrolyte fuel cell and the polymer electrolyte fuel cell stack are inexpensive and can maintain high power generation efficiency.

DESCRIPTION OF EMBODIMENTS

An embodiment of the present invention will be described below in detail. In the following description, "%" representing a chemical composition means mass % unless otherwise particularly stated.

A typical oxide film produced on the outer layer of a titanium material is mostly made of a rutile-type $TiO_2$. Such an oxide film excels in corrosion resistance but has poor electrical conductivity. It is therefore difficult to form an electrically conductive member by using a titanium material on which such an oxide film is formed.

Among titanium oxides, low-order oxides (such as $Ti_8O_{15}$, $Ti_6O_{11}$, $Ti_5O_9$, $Ti_4O_7$, $Ti_3O_5$, $Ti_2O_3$, TiO, $Ti_2O$) that are each a $TiO_2$-type titanium with oxygen deficiency have electrical conductivity. A titanium material having a low-order oxide less than $TiO_2$ formed on the outer layer thereof therefore has satisfactory electrical conductivity.

On the other hand, to impart corrosion resistance to a titanium material, the oxide film needs to be an oxide having corrosion resistance, that is, an oxide that is stable even in a corrosive environment. Investigation conducted by the present inventors shows that at least $Ti_2O_3$ and TiO have both the corrosion resistance and the electrical conductivity.

The present invention has been attained based on the finding described above.

[Titanium Material]

Figure 1:
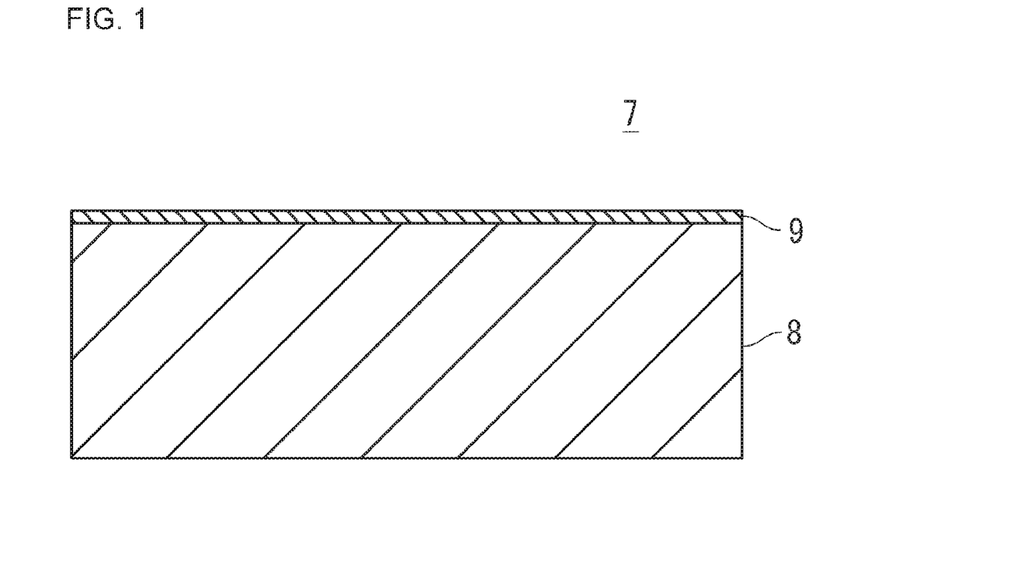
FIG. 1 is a diagrammatic cross-sectional view of a titanium material according to an embodiment of the present invention.

FIG. 1 is a diagrammatic cross-sectional view of a titanium material according to the embodiment of the present invention. A titanium material 7 includes a base metal 8 and a titanium oxide film 9, which is formed on the surface of the base metal 8.

<Base Metal>

The base metal is made of pure titanium or a titanium alloy. The "pure titanium" used herein means a metal material containing 98.8% of Ti or more with the balance being impurities. The pure titanium can, for example, be any of pure titanium materials that belong to JIS type-1 to type-4. Among them, pure titanium materials that belong to JIS type-1 and type-2 advantageously excel in economic efficiency and is readily processed. The "titanium alloy" means a metal material containing 70% of Ti or more with the balance being alloying elements and impurity elements. The titanium alloy can, for example, be JIS type-11, type-13, or type-17 for corrosion resistance applications or JIS type-60 for high-strength applications. From the viewpoint of reduction in material cost, pure titanium is preferably used as the base metal.

<Titanium Oxide Film>

The peak intensities obtained by thin-film X-ray diffraction analysis performed on the outer layer of a titanium material and using an incident angle of 0.3° (degrees) satisfy the following Formula (1):

$$I(104)+I(200))/I(101) \geq 0.08 - 0.004 \times I(200) \tag{1}$$

where

I(104): Peak intensity resulting from the plane (104) of the $Ti_2O_3$ phase,

I(200): Peak intensity resulting from the plane (200) of the TiO phase,

I(101): Peak intensity resulting from the plane (101) of the α-Ti phase, and

0<I(104), 0≤I(200), and 0<I(101).

An X-ray diffraction curve is provided by scanning at a fixed speed for the diffraction angle. In a case where adjacent peaks (diffraction lines) are present, asymmetric Pearson VII is used as a profile function to fit the provided diffraction curve for peak separation. The area of the portion above the continuous background of the provided X-ray diffraction curve is defined as the peak intensity. The "area" used herein is the integrated intensity obtained by using the measured counts.

Since the base metal is made of pure titanium or a titanium alloy, the $Ti_2O_3$ phase and the TiO phase are primarily present in the titanium oxide film. The α-Ti phase is primarily present in the base metal. The $Ti_2O_3$ phase has both the corrosion resistance and the electrical conductivity. When the amount of $Ti_2O_3$ phase (and TiO phase) present in the titanium oxide film is large enough to satisfy Formula (1), the titanium oxide film has sufficiently high corrosion resistance and electrical conductivity. A titanium material having such a titanium oxide film formed on the base metal can therefore maintain low contact resistance even in a corrosive environment. To achieve the characteristic described above, the titanium material does not need to contain precious metal. The titanium material is therefore inexpensive. The titanium material preferably satisfies the following Formula (1A):

$$I(104)+I(200))/I(101) \geq 0.10 - 0.004 \times I(200) \tag{1A}$$

The titanium oxide film may further contain a titanium oxide having a phase other than the $Ti_2O_3$ phase and the TiO phase. It is, however, preferable that the content of $TiO_2$ phase, which has poor electrical conductivity, is minimized in the titanium oxide film. According to Non Patent Literature 2, the TiO phase is superior to the $Ti_2O_3$ phase in terms of electrical conductivity. On the other hand, the $Ti_2O_3$ phase is superior to the TiO phase in terms of corrosion resistance.

An increase in the amounts of TiO phase and the $Ti_2O_3$ phase in the titanium oxide film improves the electrical conductivity of the titanium oxide film. It is, however, noted that the amount of $Ti_2O_3$ phase in the titanium oxide film may be reduced in the case where the titanium oxide film contains the TiO phase in addition to the $Ti_2O_3$ phase as compared with the case where the titanium oxide film contains no TiO phase. The reason for this is that the TiO phase is superior to the $Ti_2O_3$ phase in terms of electrical conductivity. In other words, in the comparison between the case where the titanium oxide film contains the TiO phase in addition to the $Ti_2O_3$ phase and the case where the titanium oxide film contains no TiO phase, to achieve roughly the same degree of electrical conductivity of the titanium oxide film in both cases, a more amount of $Ti_2O_3$ phase needs to be formed in the latter case than in the former case.

In carbonic reduction, which will be described later, part of the O site of TiO is replaced with C to form $TiO_{1-x}C_x$ (x<0.4) in some cases as the reduction proceeds. $TiO_{1-x}C_x$ is a phase having roughly the same physical properties as those of TiO and is assumed to be TiO. I(200) is therefore assumed to have the peak intensity (integrated intensity) resulting from the plane (200) of the $TiO_{1-x}C_x$ (x<0.4) phase.

<Thickness of Titanium Oxide Film>

The titanium oxide film preferably has a thickness 20 nm or more but 120 nm or less. In a case where the titanium oxide film has a thickness less than 20 nm, the titanium oxide film could wear when the titanium material is scraped by another member. On the other hand, in a case where the titanium oxide film has a thickness more than 120 nm, the electrical resistance of the titanium oxide film in the thickness direction thereof increases to a non-negligible value because the titanium oxide film is inferior to the base metal in terms of electrical conductivity.

<Crystalline Orientation of $Ti_2O_3$ Phase>

The peak intensity I(104) resulting from the plane (104) of the $Ti_2O_3$ phase and the peak intensity I(116) resulting from the plane (116) of the $Ti_2O_3$ phase, which are derived from the thin-film X-ray diffraction analysis, preferably satisfy the following Formula (2):

$$I(104)/I(116)>1.0 \qquad (2)$$

In the X-ray powder diffraction of $Ti_2O_3$, the largest peak results from the plane (116), and the peak intensity resulting from the plane (104) is about half the peak intensity resulting from the plane (116). Satisfying I(104)/I(116)>1.0 therefore means that the $Ti_2O_3$ phase has achieved crystalline orientation in the titanium oxide film. The thus characterized titanium oxide film has high electrical conductivity in the thickness direction thereof.

The mechanism in accordance with which the crystalline orientation increases the electrical conductivity in the thickness direction is unknown at present. It is acknowledged that as the value of I(104)/I(116) increases, the electrical conductivity in the thickness direction tends to increase. It is preferable to satisfy I(104)/I(116)>1.5.

[Method for Producing Titanium Material]

The titanium material can be produced by using a method including a first step and a second step described below. In the first step, the outer layer of the base metal is oxidized to form an oxide film primarily having the $TiO_2$ phase (hereinafter referred to as "intermediate oxide film"). In the second step, the intermediate oxide film is reduced to form a titanium oxide film having the $Ti_2O_3$ phase and, optionally, the TiO phase.

<First Step>

The first step can be a step including a heat treatment in an oxidative atmosphere or an anodic oxidation treatment. From the viewpoint of production of a homogeneous oxide film on the surface of the base metal, the anodic oxidation treatment is preferably employed.

Heat Treatment in an Oxidative Atmosphere

The oxidative atmosphere can, for example, be the ambient atmosphere. In the ambient atmosphere, to produce the intermediate oxide film on the surface of the base metal, the base metal is heated at a temperature ranging from 350° C. or more to 700° C. or less. Heating at a temperature less than 350° C. causes a thin intermediate oxide film to be produced, so that the oxide film could be lost in the reduction treatment in the second step. Heating at a temperature more than 700° C. causes a high-porosity intermediate oxide film to be produced, and the intermediate oxide film itself could fall off. A more preferable temperature range is a range from 500° C. or more to 700° C. or less, in which the interference color of blue to violet is obtained. The heating period can, for example, be 5 to 90 minutes after a predetermined temperature is reached.

Anodic Oxidation Treatment

The anodic oxidation treatment can be carried out by using an aqueous solution used in typical anode oxidation of titanium, for example, a phosphoric acid solution or a sulfuric acid solution. The voltage used in the anode oxidation is 15 V or more, and the upper-limit voltage is set at voltage that causes no dielectric breakdown (about 150 V). The voltage used in the anode oxidation preferably ranges from 40 V or more to 115 V or less. Setting the voltage at 40 V or more allows formation of an anatase-type $TiO_2$ phase in the intermediate oxide film. Carrying out the second step on the thus formed intermediate oxide film allows formation of a titanium oxide film containing large amounts of $Ti_2O_3$ phase and TiO phase. The 115 V set as described above is upper-limit voltage that still readily allows industrial anode oxidation of titanium.

The thickness of the intermediate oxide film is roughly equal to the thickness of the titanium oxide film produced after the second step is carried out. Setting the voltage used in the anode oxidation at 115 V allows an intermediate oxide film having a thickness of 170 nm to be produced. Since a titanium oxide film having the thickness has large electrical resistance, it is preferable to produce a thinner intermediate oxide film. Reducing the voltage used in the anode oxidation to 40 V, which is the lowest voltage that allows the anatase-type $TiO_2$ phase to be produced, allows reduction in the thickness of the intermediate oxide film (hence thickness of titanium oxide film) to 55 nm or less.

In both the cases where the intermediate oxide film is formed in the heat treatment in an oxidative atmosphere and the anodic oxidation treatment, Ti that forms the titanium oxide film originates from the base metal. As a result, the degree of adhesion of the titanium oxide film to the base metal increases, and the electrical conduction path between the electrically conductive titanium oxide in the titanium oxide film (such as $Ti_2O_3$ phase and TiO phase) and the base metal is readily obtained.

In contrast, in a case where a titanium oxide film is formed by adding Ti that does not originate from the base metal onto the base metal by using vapor deposition or any other means, the degree of adhesion of the titanium oxide film to the base metal is insufficient in some cases. Further, in this case, the $TiO_2$ phase, which has poor electrical conductivity, is formed on the surface of the base metal in some cases before Ti is added. In this case, the electrical conduction between the electrically conductive titanium oxide in the titanium oxide film and the base metal is hindered in some cases. The presence of the $TiO_2$ phase can be checked by acquiring an oxygen concentration profile measured in the depth direction from the surface of the titanium material and evaluating whether a high oxygen concentration portion is present in the boundary region between the base metal and the titanium oxide film. Glow discharge optical emission spectrometry (GD-OES) can, for example, be used as analysis means for acquiring the oxygen concentration profile.

<Second Step>

The second step can be a step including, for example, a reduction treatment using carbon. The treatment can be a heat treatment using a carbon source containing carbon that contributes to the reduction. In this case, the reducing power of carbon reduces $TiO_2$. Specifically, $TiO_2$ is reduced to $Ti_2O_3$ in the reaction expressed by the following Formula (a). Part of $Ti_2O_3$ can be reduced to TiO in the reaction expressed by the following Formula (b). Specifically, $Ti_2O_3$ and TiO, which are each a stoichiometric compound (compound having stoichiometric ratio), are formed in the reactions.

$$2TiO_2 + C \rightarrow Ti_2O_3 + CO\uparrow \quad (a)$$

$$Ti_2O_3 + C \rightarrow 2TiO + CO\uparrow \quad (b)$$

In the method, the carbon source used in the reduction is first supplied onto the intermediate oxide film. The carbon source can be supplied to the base metal on which the intermediate oxide film has been formed, for example, by performing skin-pass rolling, that is, rolling with the draft of 5% or less. In this case, rolling oil is used as the carbon source. In a case where the draft is more than 5%, the intermediate oxide film is broken, and the metal is undesirably exposed via the surface. In this case, a titanium material having a predetermined titanium oxide film uniformly formed on the outer layer cannot be produced, which is an unpreferable result.

The carbon source may instead be supplied, for example, by causing a substance that is carbonized when heated in a substantially oxygen-free atmosphere to adhere onto the intermediate oxide film. Examples of the substance may include a substance consisting of C (carbon), H (hydrogen), and O (oxygen) and a substance consisting of C, H, and Cl (chlorine). The substance consisting of C, H, and O is, for example, polyvinyl alcohol (hereinafter abbreviated to "PVA") and carboxymethyl cellulose (hereinafter abbreviated to "CMC"). The substance consisting of C, H, and Cl is, for example, polyvinylidene chloride and polyvinyl chloride.

PVA and CMC are each a water-soluble substance. The aqueous solutions thereof have appropriate viscosity and are therefore suitably applied onto the intermediate oxide film. Any substance that can be solved in an organic solvent can be similarly applied even the substance is not a water-soluble substance. After the application, the carbon source may be fixed to the intermediate oxide film by using air drying or hot-air drying.

In a case where the first step includes the anodic oxidation treatment, the intermediate oxide film formed on the surface of the base metal has photocatalytic activity and shows water repellency in some cases. Irradiating such an intermediate oxide film with light or ultraviolet light allows the intermediate oxide film to be so modified as to have a hydrophilic surface. Irradiating the intermediate oxide film with light or ultraviolet light in such a way that the intermediate oxide film reliably has a hydrophilic surface, however, increases the number of steps, which is disadvantage in terms of cost.

In a case where the carbon source aqueous solution has low viscosity, and when the aqueous solution is caused to adhere to the surface of the water-repellent intermediate oxide film, the aqueous solution is present in the form of water droplets on the surface of the intermediate oxide film. After the aqueous solution in this state is dried, carrying out a reduction treatment causes the carbon source to concentrate on the portions where the water droplets each formed of the aqueous solution were present, and the reduction proceeds in the portions. On the other hand, in the portion where no aqueous solution in the form of water droplets was substantially present, the reduction does not proceed. In the portion where the reduction does not proceed, no TiO or $Ti_2O_3$ is produced. The crystalline orientation of the $Ti_2O_3$ phase is achieved in the course of the carbonic reduction, as will be described later. The carbon source aqueous solution therefore needs to be uniformly applied. The aqueous solutions of PVA, CMC, and other substances, which each have appropriate viscosity, can be uniformly present after applied onto the surface of the water-repellent intermediate oxide film.

The temperature of the heat treatment is set to range from 600° C. or more to 850° C. or less. The reduction reaction does not sufficiently proceed when the temperature is less than 600° C. When the temperature is more than 850° C., the carbon in the base metal diffuses at an increased speed, resulting in possible formation of titanium carbide (TiC) in the base metal. Titanium carbide has poor corrosion resistance and therefore dissolves in an acid solution. A titanium material having titanium carbide formed in the base metal is therefore not suitable in some cases for use in an environment in which the titanium material is in contact with an acid solution, for example, use as the separators of a polymer electrolyte fuel cell. The heat treatment period is set to range from 10 seconds or more to 10 minutes or less after a predetermined temperature is reached. In a case where the heat treatment period is less than 10 seconds, the reduction reaction does not sufficiently proceed. In a case where the heat treatment period is more than 10 minutes, TiC is produced in addition to TiO and $Ti_2O_3$. In the case where the treatment period is short, carbon that has not contributed to the reduction reaction is left on the surface in some cases. Carbon is an electrically conductive substance and, even if left, does therefore not adversely affect the present invention.

The crystalline orientation of the $Ti_2O_3$ phase expressed by Formula (2) described above can be achieved by performing the anodic oxidation as the first step and then performing the carbonic reduction treatment as the second step.

The $TiO_2$ phase can also be reduced by heat-treating the base metal having an oxide film primarily made of the $TiO_2$ phase in a non-oxidative atmosphere with use of no carbon source. In this case, however, a nonstoichiometric compound is formed as the titanium oxide. For example, Patent Literature 3 discloses a method for heat-treating a base which is made of pure titanium and on which an oxide film is formed by using anodic oxidation in a non-oxidative atmosphere for several hours. In this method, the anodic oxidation produces $TiO_2$ on the surface of the base. The heat treatment in the non-oxidative atmosphere diffuses the oxygen that forms $TiO_2$ into the base. A $Ti_xO_y$-type titanium oxide formed in this method is not a stoichiometric compound, such as $TiO_2$ and TiO, and is a nonstoichiometric compound in which oxygen dissolves in solid titanium.

In contrast, causing $TiO_2$ to react with carbon allows formation of a stoichiometric compound, as described above. For example, Non Patent Literature 4 describes that mixing titanium oxide ($TiO_2$) powder with carbon black (carbon) powder and heating the mixture in a vacuum atmosphere for synthesis of titanium carbide (TiC) is accompanied by the following reaction:

$$TiO_2 \rightarrow \beta \text{ phase } (TiO_{1.8} \text{ to } TiO_{1.7})$$
$$\rightarrow Ti_2O_3 \rightarrow TiO \rightarrow TiC_xO_y \rightarrow TiC$$

The β phase provided in the first-stage reaction ($TiO_2 \rightarrow \beta$ phase ()) is a nonstoichiometric $Ti_xO_y$-type oxide, as is the titanium oxide formed by the heat treatment described in Patent Literature 3. The reaction further proceeds when carbon is present, and the second-stage reaction (β phase ($TiO_{1.8}$ to $TiO_{1.7}$) $Ti_2O_3 \rightarrow TiO$) occurs. $Ti_2O_3$, TiO, and other stoichiometric compounds are stabler than $Ti_xO_y$-type nonstoichiometric compounds. A stoichiometric compound is unlikely to change to another substance in oxidation, deoxidation, or any other reaction, as compared with a nonstoichiometric compound.

In the second step, employing the preferable condition described above allows the reaction to quickly proceed to the second stage. Further, appropriately controlling the heat treatment condition can prevent formation of TiC, as described above.

[Separator, Cell, and Polymer Electrolyte Fuel Cell Stack]

Figure 2A:
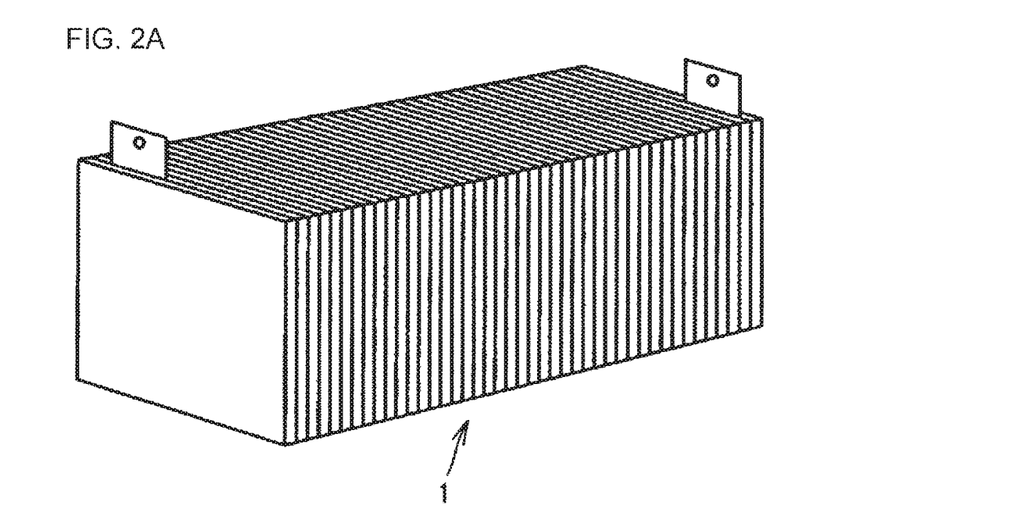
FIG. 2A is a perspective view of a polymer electrolyte fuel cell stack according to an embodiment of the present invention.
Figure 2B:
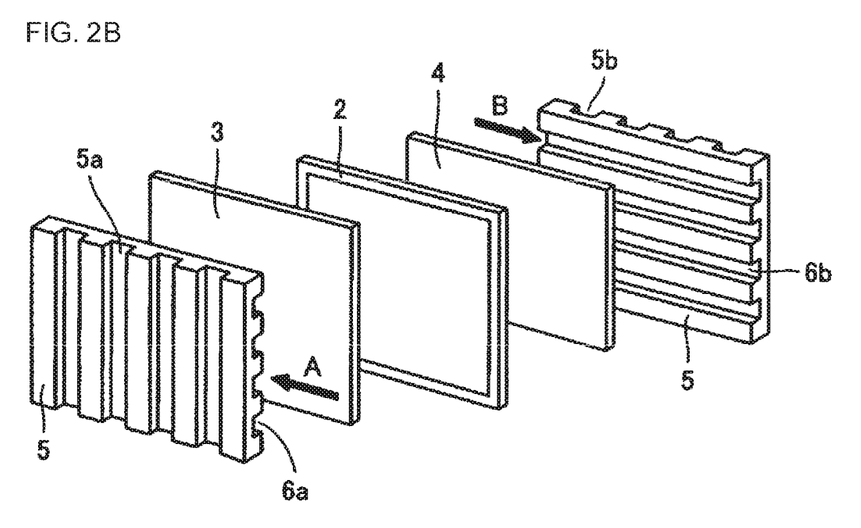
FIG. 2B is an exploded perspective view of a cell (single cell) of the fuel cell stack.

FIG. 2A is a perspective view of a polymer electrolyte fuel cell stack according to the embodiment of the present invention, and FIG. 2B is an exploded perspective view of a cell (single cell) of the fuel cell. A fuel cell stack 1 is a set of single cells, as shown in FIGS. 2A and 2B. In the fuel cell stack 1, a plurality of cells are laminated on and connected to each other in series.

In each of the single cells, a fuel electrode membrane (anode) 3 and an oxidant electrode membrane (cathode) 4 are laminated on one surface and the other surface of a solid polymer electrolyte membrane 2, respectively, as shown in FIG. 2B. Separators 5a and 5b are then layered on the opposite surfaces of the laminate. The separators 5a and 5b each include the titanium material described above. An example of a representative material that forms the solid polymer electrolyte membrane 2 is a fluorine-based ion-exchange resin membrane having a hydrogen ion (proton) exchange group.

The fuel electrode membrane 3 and the oxidant electrode membrane 4 each include a diffusion layer formed of a carbon sheet and a catalyst layer so provided as to be in contact with the surface of the diffusion layer. The carbon sheet is formed of carbon fibers. Carbon paper or carbon cloth is used as the carbon sheet. The catalyst layer is made of a particulate platinum catalyst, catalyst supporting carbon, and a fluorine resin having a hydrogen ion (proton) exchange group. An integral constituent member in which the fuel electrode membrane 3 and the oxidant electrode membrane 4 are attached to the solid polymer electrolyte membrane 2 is called a membrane electrode assembly (MEA).

A fuel gas (hydrogen or hydrogen-containing gas) A is caused to flow through channels 6a, which are each a groove formed in the separator 5a. The fuel gas is thus supplied to the fuel electrode membrane 3. In the fuel electrode membrane 3, the fuel gas passes through the diffusion layer and comes into contact with the catalyst layer. An oxidative gas B, such as air, is caused to flow through channels 6b, which are each a groove formed in the separator 5b. The oxidative gas is thus supplied to the oxidant electrode membrane 4. In the oxidant electrode membrane 4, the oxidative gas passes through the diffusion layer and comes into contact with the catalyst layer. The supply of the gases causes an electrochemical reaction, which produces DC voltage between the fuel electrode membrane 3 and the oxidant electrode membrane 4.

The separators 5a and 5b, which each include the titanium material described above, have low initial contact resistance against the electrode membranes 3 and 4. Since the titanium material has corrosion resistance, the low contact resistance is maintained in the separator environment of the polymer electrolyte fuel cell stack 1.

The channels 6b may be formed in the other surface of the separator 5a (the surface opposite the surface in which the channels 6a are formed). The channels 6a may be formed in the other surface of the separator 5b (the surface opposite the surface in which the channels 6b are formed). The separators 5a and 5b so shaped as to each have the channels (grooves) formed therein can be produced by press-forming a thin-plate-shaped titanium material.

Instead, a plate-shaped base metal may be shaped to have a form of the separators 5a and 5b, and the titanium oxide film described above having the $Ti_2O_3$ phase and other phases may be formed on the surface of the base metal. Also in this case, the separators 5a and 5b each including the titanium material including the base metal and the predetermined titanium oxide film formed on the base metal can be produced.

In the cells and the polymer electrolyte fuel cell stack 1, the low contact resistance between the separators 5a, 5b and the electrode membranes 3, 4 is maintained. The cells and the polymer electrolyte fuel cell stack 1 can thus maintain high power generation efficiency. Further, since the separators 5a and 5b need to use no precious metal, the cells and the polymer electrolyte fuel cell stack 1 are inexpensive.

Example

A variety of titanium materials were produced and evaluated to verify the effects of the present invention.

1. Base Metal

As the base metal, a plate-shaped JIS type-1 titanium material having a thickness of 0.1 mm and a plate-shaped JIS type-17 titanium alloy material having a thickness of 1 mm were used. Table 1 shows the composition of the base metal.

TABLE 1

| Base metal code | Composition (unit: mass %, the balance is Ti.) | | | | | | Remarks |
| --- | --- | --- | --- | --- | --- | --- | --- |
| | C | H | O | N | Fe | Pd | |
| A | 0.01 | 0.002 | 0.04 | 0.01 | 0.04 | — | JIS type-1 |
| B | 0.002 | 0.002 | 0.03 | 0.004 | 0.02 | 0.06 | JIS type-17 |

2. Formation of Titanium Oxide Film

After the intermediate oxide film was formed on the outer layer of the base metal as the first step, the intermediate oxide film was reduced as the second step to form the titanium oxide film.

2-1. Formation of Intermediate Oxide Film

The intermediate oxide film was formed by performing ambient oxidation or anodic oxidation on the outer layer of the base metal. The ambient oxidation was performed by using a gas-exchange muffle furnace manufactured by AS ONE Corporation to introduce air from an air cylinder into the furnace at a flow rate of 0.5 L/min. The anodic oxidation was performed by using a counter electrode made of platinum in a 10-mass % sulfuric acid aqueous solution to apply predetermined voltage from a stabilized DC power supply to between the base metal and the counter electrode. After the voltage application started, the current gradually decreased and became stable at a low value. Thereafter, the treatment was maintained for 30 seconds before terminated.

An X-ray diffraction apparatus, model RINT 2500, manufactured by Rigaku Corporation was used to identify the type of the $TiO_2$ phase in the vicinity of the surface of each of the resultant samples: the rutile type or the anatase type. In the identification process, a target made of Co was used, and the incident angle was set at 0.3°. $TiO_2$ was the titanium oxide that forms the intermediate oxide film.

2-2. Reduction of Intermediate Oxide Film

The intermediate oxide film was reduced by using PVA. A reagent manufactured by KISHIDA CHEMICAL Co., Ltd. (degree of polymerization: 500, degree of saponification: 86.5 to 89) was used as PVA. A 10-mass % aqueous solution of the PVA was prepared. The base metal on which the intermediate oxide film was formed was immersed in the aqueous solution at room temperature to apply the aqueous solution onto the surface of the intermediate oxide film. The base metal was then dried for 24 hours in the air at the atmospheric pressure. The base metal having undergone the treatments described above was heated in an Ar atmosphere to reduce the intermediate oxide film. The Ar atmosphere was produced by using an industrial argon gas containing O having purity ranging from 99.995% or more to less than 3 ppm.

3. Identification of Outer Layer Oxide/Investigation of Crystalline Orientation

An outer layer portion of each of the titanium materials resulting from the treatments described above was measured in terms of the peak intensities I(104), I(200), I(100), and I(116) by using thin-film X-ray diffraction analysis under the following conditions, as in the identification of the $TiO_2$ phase of the intermediate oxide film described above. Whether the samples satisfy Formula (1) was evaluated based on the intensities, and the value of I(104)/I(116) was determined.

The peak intensities were determined as follows: Thin-film X-ray diffraction was performed on the outer layer of each of the titanium materials with the incident angle of the X-rays incident on the surface of the titanium material set at 0.3°. Diffraction curves having the peak resulting from the (104) plane of the $Ti_2O_3$ phase, the peak resulting from the (116) plane of the $Ti_2O_3$ phase, the peak resulting from the (200) plane of the TiO phase, and the peak resulting from the (101) plane of the α-Ti phase were thus obtained. Asymmetric Pearson VII was used as a profile function to fit the resultant diffraction curves for peak separation.

The integrated intensity of the peak resulting from the (104) plane of the $Ti_2O_3$ phase was calculated to determine I(104). The integrated intensity of the peak resulting from the (116) plane of the $Ti_2O_3$ phase was calculated to determine I(116). The integrated intensity of the peak resulting from the (200) plane of the TiO phase was calculated to determine I(200). The integrated intensity of the peak resulting from the (101) plane of the α-Ti phase was calculated to determine I(101).

4. Thickness of Titanium Oxide Film

The thickness of the titanium oxide film was determined by performing XPS-based (X-ray Photoelectron Spectroscopy) O-content analysis in the depth direction of each of the titanium materials from the surface thereof. Quantum 2000 manufactured by ULVAC-PHI, Inc. was used as the measurement apparatus. A mono-Al $K_\alpha$ line was used as the X-ray source. The beam diameter of the X-rays was set at 200 μm. At the measurement, $Ar^+$ was accelerated at acceleration voltage of 2 kV to sputter the surface of the titanium material at a sputtering speed of 5.4 nm/min. Three depths at which the O content decreased to half the maximum thereof were measured, and the average of the three depths was defined as the thickness of the titanium oxide film.

5. Measurement of Contact Resistance

Figure 3:
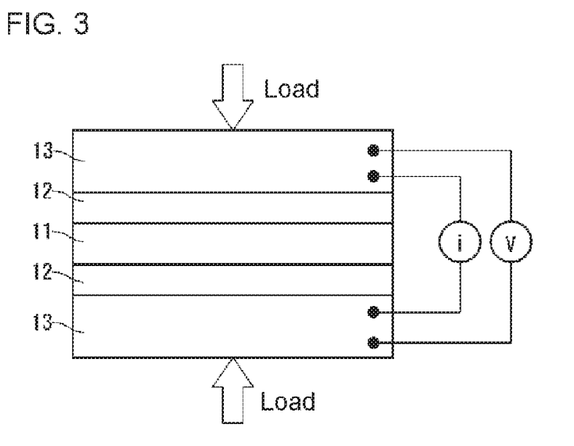
FIG. 3 shows the configuration of an apparatus for measuring the contact resistance of a titanium material.

The contact resistance of the resultant titanium material samples was measured in accordance with the method described in Non-Patent Literature 3. FIG. 3 shows the configuration of an apparatus for measuring the contact resistance of a titanium material. The apparatus was used to measure the contact resistance of each of the samples. With reference to FIG. 3, a produced sample 11 was first sandwiched between a pair of carbon paper sheets (TGP-H-90 manufactured by TORAY INDUSTRIES, INC.) 12 used as electrode membranes (gas diffusion layers) for a fuel cell, and the resultant structure was sandwiched between a pair of gold-plated electrodes 13. The area of each of the carbon paper sheets 12 was 1 $cm^2$.

Load of 10 $kgf/cm^2$ ($9.81 \times 10^5$ Pa) was then applied to between the pair of gold-plated electrodes 13. FIG. 3 shows the direction of the load with the open arrows. In this state, fixed current was caused to flow between the pair of gold-plated electrodes 13, and a voltage drop that occurred between the carbon paper sheets 12 and the sample 11 was measured. The resistance value was determined based on the result of the measurement. The resultant resistance value, which was the sum of the contact resistance values at the opposite surfaces of the sample 11, was divided by 2 to provide a contact resistance value per surface of the sample 11. The thus measured contact resistance was defined as first contact resistance.

The load applied to between the pair of gold-plated electrodes 13 was then repeatedly changed 10 times between 5 $kgf/cm^2$ ($4.90 \times 10^5$ Pa) and 20 $kgf/cm^2$ ($19.6 \times 10^5$ Pa). The pressure was then changed to 10 $kgf/cm^2$ ($9.81 \times 10^5$ Pa), and the contact resistance was measured as in the first contact resistance measurement. The thus measured contact resistance was defined as 10-time weighted contact resistance.

6. Investigation of corrosion resistance

The resultant titanium material samples were immersed in an $H_2SO_4$ aqueous solution at 90° C. having pH of 2 for 96 hours, then sufficiently rinsed, and dried. The contact resistance was then measured by using the method described above. In a case where the corrosion resistance is poor, the passivation film on the outer layer of the titanium material grows, and the contact resistance therefore increases as compared with the contact resistance before the immersion (initial contact resistance).

Table 2 shows the conditions under which the titanium materials were produced and results of the evaluation.

TABLE 2

| | Base metal | First step: outer layer oxidation treatment | | | | | Second step: Reduction treatment | | Thin-film X-ray diffraction I(104) |
|---|---|---|---|---|---|---|---|---|---|
| | | Ambient oxidation | | Anodic oxidation | | | Carbonic reduction | | |
| | | Temperature (° C.) | Period (hr) | Voltage (V) | Outer layer $TiO_2$ | | Maintained temperature (° C.) | Maintained period (min) | |
| Comparative Example 1 | A | — | — | — | — | | — | — | — |
| Comparative Example 2 | B | — | — | — | — | | — | — | — |
| Inventive Example 1 | A | 500 | 1 | — | Rutile type | | 700 | 1 | 64 |
| Inventive Example 2 | A | 700 | 1 | — | Rutile type | | 700 | 1 | 70 |
| Inventive Example 3 | A | — | — | 15 | Rutile type | | 720 | 0.5 | 39 |
| Inventive Example 4 | A | — | — | 25 | Rutile type | | 720 | 0.5 | 46 |
| Inventive Example 5 | A | — | — | 35 | Rutile type | | 720 | 0.5 | 48 |
| Inventive Example 6 | A | — | — | 50 | Anatase type | | 720 | 0.5 | 34 |
| Inventive Example 7 | A | — | — | 60 | Anatase type | | 720 | 0.5 | 32 |
| Inventive Example 8 | A | — | — | 70 | Anatase type | | 720 | 0.5 | 15 |
| Inventive Example 9 | A | — | — | 82 | Anatase type | | 720 | 0.5 | 13 |
| Inventive Example 10 | A | — | — | 115 | Anatase type | | 720 | 0.5 | 16 |
| Inventive Example 11 | B | — | — | 60 | Anatase type | | 720 | 0.5 | 28 |
| Inventive Example 12 | B | — | — | 82 | Anatase type | | 720 | 0.5 | 19 |
| Inventive Example 13 | A | — | — | 82 | Anatase type | | 550 | 60 | 30 |
| Inventive Example 14 | A | — | — | 82 | Anatase type | | 610 | 10 | 16 |
| Inventive Example 15 | A | — | — | 82 | Anatase type | | 700 | 1 | 21 |
| Inventive Example 16 | A | — | — | 82 | Anatase type | | 800 | 0.5 | 21 |
| Inventive Example 17 | A | — | — | 82 | Anatase type | | 840 | 0.5 | 35 |
| Inventive Example 18 | A | — | — | 82 | Anatase type | | 860 | 0.2 | 15 |
| Inventive Example 19 | A | — | — | 82 | Anatase type | | 720 | 0.2 | 9 |
| Inventive Example 20 | A | — | — | 82 | Anatase type | | 700 | 1 | 42 |
| Comparative Example 3 | A | — | — | 82 | Anatase type | | 740 | 2 | 53 |
| Comparative Example 4 | A | — | — | 82 | Anatase type | | 680 | 1 | 10 |
| Conventional Example 1 | — | — | — | — | — | | — | — | — |
| Conventional Example 2 | — | — | — | — | — | | — | — | — |
| Conventional Example 3 | A | — | — | 68 | Anatase type | | — | — | 0 |

| | Thin-film X-ray diffraction | | | | Film thickness (nm) | Contact resistance (mΩ · cm²) | | | |
|---|---|---|---|---|---|---|---|---|---|
| | | | | | | Initial | | After corrosion test | |
| | I(200) | I(101) | Formula (1) satisfied? | I(104)/I(116) | | First | After 10-time weighting | First | After 10-time weighting |
| Comparative Example 1 | — | — | — | — | — | 124 | 166 | 11346 | 44536 |
| Comparative Example 2 | — | — | — | — | — | 111 | 148 | 8469 | 12682 |
| Inventive Example 1 | 0 | 789 | Satisfied | 0.42 | 25 | 28 | 28 | 29 | 29.8 |
| Inventive Example 2 | 0 | 730 | Satisfied | 0.55 | 37 | 18 | 19 | 19 | 21 |
| Inventive Example 3 | 8 | 830 | Satisfied | 1.01 | 25 | 14.2 | 14.9 | 14.8 | 14.9 |
| Inventive Example 4 | 8 | 744 | Satisfied | 1.03 | 34 | 13.2 | 13.6 | 14.8 | 14.9 |
| Inventive Example 5 | 8 | 720 | Satisfied | 1.25 | 42 | 11.3 | 11.8 | 12.6 | 13 |
| Inventive Example 6 | 12 | 525 | Satisfied | 1.67 | 65 | 8.9 | 9.2 | 9.3 | 9.7 |
| Inventive Example 7 | 9 | 455 | Satisfied | 2.06 | 72 | 7.6 | 7.9 | 8.1 | 8.4 |
| Inventive Example 8 | 22 | 402 | Satisfied | 2.63 | 84 | 5.1 | 5.2 | 5.4 | 5.6 |
| Inventive Example 9 | 23 | 392 | Satisfied | 3.30 | 89 | 4.1 | 3.8 | 4.3 | 4.6 |
| Inventive Example 10 | 20 | 304 | Satisfied | 3.96 | 111 | 3.3 | 3.4 | 3.6 | 3.7 |
| Inventive Example 11 | 22 | 522 | Satisfied | 1.77 | 66 | 4.2 | 4.1 | 4.4 | 4.5 |
| Inventive Example 12 | 30 | 523 | Satisfied | 3.44 | 67 | 4.1 | 4 | 4.3 | 4.5 |
| Inventive Example 13 | 0 | 326 | Satisfied | 0.71 | 105 | 25.2 | 26.7 | 28.1 | 29.2 |
| Inventive Example 14 | 11 | 351 | Satisfied | 1.15 | 88 | 12.3 | 13.2 | 14.1 | 14.3 |
| Inventive Example 15 | 55 | 699 | Satisfied | 2.06 | 41 | 4.3 | 4.3 | 4.7 | 4.9 |
| Inventive Example 16 | 80 | 731 | Satisfied | 2.61 | 36 | 3.6 | 3.8 | 4.1 | 4.3 |
| Inventive Example 17 | 60 | 830 | Satisfied | 3.25 | 28 | 3.8 | 3.9 | 3.9 | 3.9 |
| Inventive Example 18 | 40 | 991 | Satisfied | 1.41 | 18 | 3.8 | 4.7 | 10.1 | 12.2 |
| Inventive Example 19 | 13 | 247 | Satisfied | 1.68 | 145 | 28.7 | 28.9 | 29.3 | 29.8 |
| Inventive Example 20 | 0 | 517 | Satisfied | 1.77 | 59 | 8.3 | 8.9 | 9.1 | 9.3 |
| Comparative Example 3 | 0 | 736 | Not satisfied | 0.77 | 32 | 31.1 | 34.2 | 34.3 | 36.6 |
| Comparative Example 4 | 7 | 346 | Not satisfied | 0.86 | 88 | 61.2 | 66.3 | 62.3 | 64.6 |
| Conventional Example 1 | — | — | — | — | — | 4 | — | 9 | — |
| Conventional Example 2 | — | — | — | — | — | — | — | 4.2 | — |
| Conventional Example 3 | 2 | 1086 | Not satisfied | 0 | — | 11 | 13.3 | 8711 | 2197 |

"—" represents in the production method that the relevant step was not carried out, and
"—" represents in the evaluation results that no measurement was performed.

The Inventive Examples 1 to 20 all satisfied Formula (1). In the Inventive Examples 1 to 20, the contact resistance values at the first measurement were roughly equal to the ten-time weighted contact resistance both at the initial measurement and after the corrosion test. The contact resistance of each of the titanium materials had a low value less than 30 mΩ·cm² both at the initial measurement and after the corrosion test. In other words, the titanium materials were verified to have both high electrical conductivity and corrosion resistance.

In the Inventive Example 19, the contact resistance was slightly higher than those in the other Inventive Examples. The reason for this is believed to be the fact that the thickness of the titanium oxide film was more than 120 nm in the Inventive Example 19, whereas the thickness in each of the other Inventive Examples was 120 nm or less.

Among the Inventive Examples, it was acknowledged that the titanium materials that each satisfied Formula (1A) and included a titanium oxide film having a thickness of 120 nm or less (Inventive Examples 4 to 12 and 14 to 18) tended to have low contact resistance both at the initial measurement and after the corrosion test, as compared with the titanium materials that did not satisfy Formula (1A) (Inventive Examples 1 to 3 and 13).

Among the Inventive Examples, it was acknowledged that the titanium materials having a peak resulting from TiO (I(200)) detected in the thin-film X-ray diffraction analysis tended to have low contact resistance both at the initial measurement and after the corrosion test, as compared with the titanium materials having no detected peaks (Inventive Examples 1, 2, 13 and 20). The reason for this is believed to be as follows: A titanium material having the TiO phase formed in the titanium oxide film in addition to the $Ti_2O_3$ phase has electrical conductivity higher than that of a titanium material having no TiO phase formed in the titanium oxide film because the TiO phase has electrical conductivity higher than the $Ti_2O_3$ phase.

In the Inventive Examples 2 and 20, in which the titanium oxide film had no TiO phase, the Inventive Example 20 satisfied Formula (2), whereas the Inventive Example 2 did not satisfy Formula (2). The contact resistance after the corrosion test in Inventive Example 20 was half the contact resistance in Inventive Example 2 or less. The result shows that the orientation of the $Ti_2O_3$ phase reduces the contact resistance. It was acknowledged that even a titanium material in which the titanium oxide film had both the $Ti_2O_3$ phase and the TiO phase tended to have lower contact resistance after the corrosion test when the I(104)/I(116) (left-hand side of Formula (2)) had a larger value.

Comparative Examples 1 and 2 were non-treated base metals A and B, respectively. It is believed that a naturally oxidized film primarily made of $TiO_2$ has been formed on the outer layer portion of each of the bases. In Comparative Examples 1 and 2, the contact resistance was initially more than 100 mΩ·cm² and greatly increased after the corrosion test. The contact resistance values at the initial measurement greatly increased after the ten-time weighting both at the initial measurement and after the corrosion test.

Comparative Examples 3 and 4 were titanium materials including base metals having undergone the anodic oxidation and carbonic reduction but did not satisfy the requirement of Formula (1). The contact resistance of each of the titanium materials was more than 30 mΩ·cm² both at the initial measurement and after the corrosion test. The reason for this is believed to be the fact that the titanium oxide film contains less amounts of electrically conductive titanium oxide (such as $Ti_2O_3$ and TiO).

Table 2 shows, as Conventional Examples 1 and 2, values of the contact resistance after the corrosion test (measured under the condition that the load was 10 kgf/cm²) shown in Examples in Patent Literatures 1 and 2. The conditions of the corrosion tests in Patent Literatures 1 and 2 were, however, not the same as the conditions in the present example. Nevertheless, since the titanium materials were immersed in sulfuric-acid-based solutions both in Patent Literatures 1, 2 and the present examples, it is believed that the titanium materials in Patent Literatures 1 and 2 are allowed to be compared with the titanium material of the present invention to some extent.

In each of Patent Literatures 1 and 2, the titanium material used a precious metal, as described above. In contrast, no precious metal was used in the Inventive Examples. Nevertheless, in the Inventive Examples, the contact resistance at the initial (first) measurement and after the (first) corrosion test was as small as the contact resistance of the titanium materials in Patent Literatures 1 and 2.

Table 2 further shows, as Conventional Example 3, the conditions under which the titanium material was produced in accordance with the method described in Patent Literature 3 and results of the evaluation of the titanium material. The titanium material in Conventional Example 3 was produced by performing anodic oxidation on the base metal A (JIS type-1 pure titanium) and then heat-treating the oxidized base A. The base metal had a form of a plate having a thickness of 0.1 mm. The anodic oxidation was performed by applying voltage of 68 V to a platinum cathode in a 10%-$H_2SO_4$ aqueous solution at 35° C. The heat treatment was performed at 670° C. maintained for 1.5 hours in a vacuum (reduced pressure) atmosphere with the pressure of $2\times10^{-4}$ Torr ($2.7\times10^{-2}$ Pa) or less.

The initial contact resistance of the titanium material in Conventional Example 3 was a low value of 15 Ω·cm² or less, but the contact resistance after the corrosion test greatly increased to 2000 Ω·cm² or more. I(104) and I(200) of the titanium material in Conventional Example 3 were roughly 0, that is, the $Ti_2O_3$ phase or the TiO phase was hardly detected, as shown in Table 2. It is therefore believed that a titanium oxide primarily made of a nonstoichiometric compound had been formed on the surface of the titanium material in Conventional Example 3 and the majority of the titanium oxide was converted into $TiO_2$ in the oxidation in the corrosion test, resulting in the greatly increased contact resistance after the corrosion test. Comparison with the Inventive Example therefore shows that a nonstoichiometric compound is significantly likely to be oxidized as compared with a stoichiometric compound.

REFERENCE SIGNS LIST

1: polymer electrolyte fuel cell stack
5a, 5b: Separator
7: Titanium material
8: Base metal
9: Titanium oxide film
11: Sample (titanium material)

The invention claimed is:
1. A titanium material comprising:
a base metal made of pure titanium or a titanium alloy; and
a titanium oxide film formed on the base metal, the titanium oxide film comprising primarily a $Ti_2O_3$ phase and a TiO phase, wherein peak intensities obtained by X-ray diffraction thin-film analysis performed on an outer layer of the titanium material using an incident angle of 0.3° satisfy a following Formula (1):

$$\left(\frac{I(104)+I(200)}{I(101)}\right) \geq 0.08 - 0.004 \times I(200) \tag{1}$$

where
I(104) is a peak intensity between 9-70 resulting from a plane (104) of the $Ti_2O_3$ phase,
I(200) is a peak intensity between 8-80 resulting from a plane (200) of the TiO phase,
I(101) is a peak intensity between 247-991 resulting from a plane (101) of an α-Ti phase, and
0<I(104), 0≤I(200), and 0<I(101).

2. The titanium material according to claim 1, wherein the peak intensity I(104) resulting from the plane (104) of the $Ti_2O_3$ phase and a peak intensity I(116) resulting from a plane (116) of the $Ti_2O_3$ phase, which are derived from the X-ray diffraction thin-film analysis, satisfy a following Formula (2):

$$\frac{I(104)}{I(116)} > 1.0. \tag{2}$$

3. The titanium material according to claim 1, wherein the titanium oxide film has a thickness ranging from 20 to 120 nm.

4. A separator for a polymer electrolyte fuel cell, the separator comprising the titanium material according to claim 1.

5. A polymer electrolyte fuel cell, the cell comprising the separator according to claim 4.

6. A polymer electrolyte fuel cell stack comprising the cell according to claim 5.

\* \* \* \* \*